United States Patent

[11] 3,551,763

[72] Inventor Basil W. Hakki
Summit, N.J.
[21] Appl. No. 757,821
[22] Filed Sept. 6, 1968
[45] Patented Dec. 29, 1970
[73] Assignee Bell Telephone Laboratories, Incorporated
Murray Hill, Berkeley Heights, N.J.
a corporation of New York

[54] MAGNESIUM ZINC TELLURIDE AND ELECTROLUMINESCENT DEVICE
3 Claims, 5 Drawing Figs.

[52] U.S. Cl. .................... 317/237,
29/576: 148/175: 23/315
[51] Int. Cl. .................... H01l 3/20
[50] Field of Search .................... 317/237,
234, 48.3; 23/55, 67, 315; 252/62.3

[56] References Cited
UNITED STATES PATENTS

| | | | |
|---|---|---|---|
| 3,390,090 | 6/1968 | Taylor et al. | 23/315 |
| 3,312,571 | 4/1967 | Ruehrwein | 148/175 |
| 3,413,506 | 11/1968 | Cuthbert et al. | 317/237X |
| 3,413,507 | 11/1968 | Itoh et al. | 313/108 |
| 3,454,370 | 7/1969 | Castellion | 23/315 |

*Primary Examiner*—James D. Kallam
*Attorneys*—R. J. Guenther and Edwin B. Cave

ABSTRACT: $(Mg_xZn_{1-x})$ Te semiconductor compositions, wherein $x$ ranges from 0.15 to 0.04, have been found to be amphoteric and manifest electroluminescent properties.

Figure 1A:
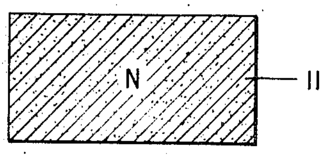

INVENTOR
B. W. HAKKI
BY
ATTORNEY

MAGNESIUM ZINC TELLURIDE AND ELECTROLUMINESCENT DEVICE

This invention relates to compositions useful in electroluminescent devices and to such devices. More particularly, the present invention relates to Group II—VI semiconductive compositions and to electroluminescent junction devices utilizing such compositions.

Recently, there has been a birth of interest in a class of junction devices which evidence electroluminescence at the junction. Typically, these devices are capable of producing electroluminescence in the visible range of spectrum, so suggesting multiple uses in the fields of illumination and information display.

In accordance with the present invention, a technique is described for the growth of Group II—VI compositions in the magnesium-zinc-tellurium system, which evidence amphoteric properties, that is, they are amenable to being doped either *p*-type or *n*-type. The inventive technique also relates to the use of such compositions in novel two terminal *p-n* junction devices. Magnesium-zinc-telluride prepared as described herein has been found to emit light over the range of 1.77 to 2.52 electron volts (7,000 A. to 4,900 A.) at room temperature.

The invention will be more readily understood by reference to the following detailed description taken in conjunction with the accompanying drawing wherein:

FIGS. 1A through 1E are cross-sectional views in successive stages of manufacture of an electroluminescent junction device of the present invention.

With reference now to the growth process, the first step involves preparing a melt comprising magnesium zinc, and tellurium, together with any desired dopant. In accordance with the present invention, it has been determined that compositions in the magnesium-zinc-tellurium system evidence amphoteric properties when the value of $x$ in the general formula $(Mg_xZn_{1-x})$the ranges from 0.15—0.4. Studies have revealed that compositions in the described system wherein $x$ is less than 0.15 are of *p*-type conductivity and do not evidence amphoteric properties. The upper limit of 0.4 is dictated by practical considerations (*n*-type).

The required charge including magnesium, zinc, tellurium, and any dopant desired for the purpose of forming either a *p* or *n* type material is then placed in a graphite boat or other suitable vessel and the boat inserted at one end of a graphite tube or sleeve. Next, a suitable substrate member is positioned in the graphite sleeve at the end opposite the boat. For the purposes of the present invention, substrate materials are selected from among those semiconductive materials evidencing a zincblende structure and a lattice constant within ±10 percent of the lattice constant of magnesium-zinc-telluride (6.1 A.). Materials found particularly useful for this purpose are zinc telluride, zinc selenide, and so forth.

Following, the graphite sleeve is inserted in a quartz tube to which is added a halogen or halide compound in an amount sufficient to provide at least 1 milligram of halogen per cubic centimeter of volume of the reaction tube, the minimum being dictated by considerations relating to the amount of halogen required to enter into reaction with the elemental materials to form the corresponding halides. Then, one end of the quartz tube is sealed and the tube evacuated. Thereafter, forming gas is introduced into the system and the preceding cycle then repeated at least twice for the purpose of reducing the level of residual gas contamination. Finally, the opposite end of the tube is sealed, a residual pressure of from 10—100 microns of forming gas obtaining in the system. Next, the sealed tube is placed in a furnace and heated for several hours in a flat temperature profile to approximately 900° C., so resulting in reaction of the elemental materials to yield magnesium telluride and zinc telluride. After reaction of the elements, the temperature profile is changed in such fashion that the temperature ranges from 825° C. at the substrate end of the vessel to approximately 995° C. at the source end of the vessel, heating being continued for a time period ranging from 72—96 hours. At the end of this period, the substrate member and the resultant crystalline material deposited thereon are removed and cooled to room temperature.

A suitable crystal having been prepared, the next step in the inventive process involves the preparation of a two-terminal junction device. As indicated, the crystalline materials grown in the described manner may be doped in any suitable manner by the addition of either a donor or acceptor material during the growth process.

Figure 1B:
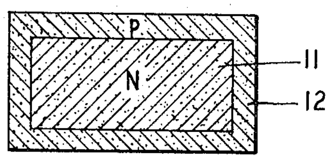
Figure 1C:
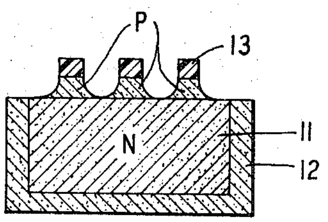
Figure 1D:
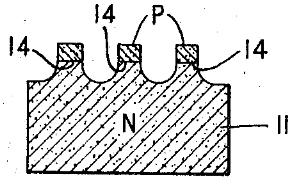
Figure 1E:
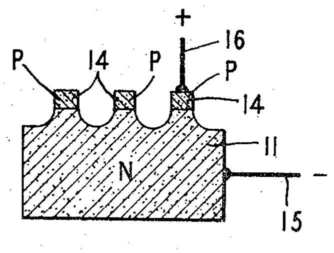

With further reference now to the drawing, FIG. 1A shows an *n*-type crystal 11 of magnesium-zinc-telluride prepared as described. As a preliminary step, it is important to rid the surface of the crystal of all traces of undesirable impurities. To this end, the crystal is advantageously etched in methanol-bromine for 10—15 seconds, so preparing it for the formation of a surface diffusion layer of *p*-type conductivity. The crystal is then loaded into a quartz tube containing a charge of phosphorus, the tube flamed, evacuated, and sealed under vacuum. Then the tube is heated to a temperature of the order of 900° C. for a time period ranging from 10 to 20 hours. FIG. 1B shows the resultant crystal 11 over whose surface there is formed a *p*-type diffusion phosphorus layer 12. Next, mesas 13 (FIG. 1C) are formed upon the surface of layer 12 by conventional photoresistive and chemical etching techniques. Next, the crystal is again etched in methanol-bromine to remove any surface damage, thereby resulting in a structure containing *p-n* junctions 14 as shown in FIG. 1D. Finally, point contacts 15 and 16 are made to the *p* and *n* regions respectively by conventional procedures.

An example of the application of the present invention is set forth below. It is intended merely as an illustration and it is to be appreciated that the methods described may be varied by one skilled in the art without departing from the spirit and scope of the invention.

EXAMPLE

A magnesium-zinc-telluride crystal and elecroluminescent junction device are prepared as follows:

0.313 grams magnesium, 2.01 grams of zinc, 5.59 grams of tellurium and 0.02 grams of aluminum are placed in a graphite boat which is then inserted in a graphite tube, a zinc-telluride substrate being mounted at the opposite end of the tube.

The graphite tube is next inserted in a quartz tube and 0.1 gram of iodine added thereto. Then, one end of the quartz tube is sealed and the system alternatively evacuated and flushed with forming gas three times. Thereafter, the other end of the quartz tube is sealed and the tube inserted in an oven and heated at 900° C. for 5 hours in a flat temperature profile. Following, the temperature profile is changed so that the substrate is heated at 850° C. and the source end at 970° C. for 96 hours. The substrate member and the resultant crystalline material are then removed from the system and cooled to room temperature. The desired *n*-type magnesium-zinc-telluride crystal is then separated from the substrate member by mechanical means.

The resultant crystal is etched in methanol-bromine for 15 seconds and placed in a quartz tube containing 100.0 milligrams of phosphorus. The tube is flamed, evacuated and sealed under vacuum. Next, the tube is placed in a furnace, heated to 900° C. and maintained thereat for 20 hours. The crystal is then removed from the tube, and mesas 10 mils in diameter formed thereon by conventional photoresistive and chemical etching techniques. Then the crystal is etched in methanol-bromine for 45 seconds to remove surface damage. Finally, metallic point contacts are made to the *p* and *n* regions respectively.

In order to demonstrate the efficacy of the device, the leads are connected to a DC source under forward bias conditions, the + lead to the *p* region and the − lead to the *n* region. At room temperature, at voltages ranging from 1.7 to 3.0 volts, the device emits light centered at about 2.5 electron volts (5,000 A.).

I claim:

1. A semiconductor comprising $(Mg_xZn_{1-x})Te$ wherein $x$ ranges from 0.15—0.4.

2. A semiconductor device including $(Mg_xZn_{1-x})$ty Te wherein $x$ ranges from 0.15—0.4, said device comprising a *p-n* junction.

3. A device in accordance with claim 2 including means for passing current therethrough.